US008721297B1

(12) United States Patent
Ahmed et al.

(10) Patent No.: US 8,721,297 B1
(45) Date of Patent: May 13, 2014

(54) MULTISTAGE PULSATING AIRLIFT PUMP

(71) Applicant: King Fahd University of Petroleum and Minerals, Dhahran (SA)

(72) Inventors: Wael Hasan Ahmed, Dhahran (SA); Amro Mohamed Al Qutub, Dhahran (SA); Hassan Mohamed Badr, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 13/910,068

(22) Filed: Jun. 4, 2013

(51) Int. Cl.
*F04F 1/18* (2006.01)
*F04B 49/00* (2006.01)

(52) U.S. Cl.
USPC .............................. 417/111; 417/46; 417/108

(58) Field of Classification Search
USPC ................ 417/111, 108, 90, 91, 109, 117, 46
See application file for complete search history.

(56) References Cited

U.S. PATENT DOCUMENTS

| 1,766,382 | A | * | 6/1930 | Jones et al. | 417/121 |
| 2,064,966 | A | * | 12/1936 | Williamson | 417/117 |
| 2,674,202 | A | * | 4/1954 | Kork et al. | 417/172 |
| 3,111,906 | A | * | 11/1963 | Nelson | 417/115 |
| 3,694,106 | A | * | 9/1972 | Walker | 417/109 |
| 3,718,407 | A | | 2/1973 | Newbrough | |
| 4,354,524 | A | * | 10/1982 | Higgins | 137/624.14 |
| 5,172,717 | A | * | 12/1992 | Boyle et al. | 137/155 |
| 5,382,137 | A | | 1/1995 | Lane | |
| 5,561,245 | A | * | 10/1996 | Georgi et al. | 73/152.02 |
| 6,237,692 | B1 | * | 5/2001 | Averhoff | 166/372 |
| 7,267,328 | B2 | | 9/2007 | Witheridge | |
| 2008/0229819 | A1 | * | 9/2008 | Mayleben et al. | 73/304 C |
| 2012/0308407 | A1 | | 12/2012 | Badr et al. | |

* cited by examiner

*Primary Examiner* — Devon Kramer
*Assistant Examiner* — Lilya Pekarskaya
(74) *Attorney, Agent, or Firm* — Richard C Litman

(57) ABSTRACT

The multistage pulsating airlift pump includes a lowermost air injector stage and at least air injector stage above the lowermost stage installed in a lift pipe. Each stage includes a multifunction timer. The stages above the lowermost stage have sensors along the lift pipe communicating with the respective timers of those stages. The timers are adjusted to provide time delays in accordance with a number of parameters, e.g., the height of the pipe, pressure head, etc. When a sensor detects a rising gas slug, the sensor sends a signal to its timer to start an elapsed delay time. When the delay time has elapsed, the timer opens a control valve to send another volume of gas into the injector in the pipe. The sequentially spaced series of gas slugs rising in the pipe provide constant lifting for the liquid to a much greater height than using a single-stage airlift pump.

6 Claims, 3 Drawing Sheets

MULTISTAGE PULSATING AIRLIFT PUMP

BACKGROUND OF THE INVENTION

1. Field of the Invention

The present invention relates generally to fluid pumps, and particularly to a multistage pulsating airlift pump incorporating two or more airlift pump stages that communicate with one another electronically to time their outputs for increasing the total lifting action of the assembly.

2. Description of the Related Art

The conventional airlift pump is a simple device, comprising a discharge or jet of air or other gas into the lower end or portion of a substantially vertical standpipe situated in a body of water or other liquid. The air or gas jet entrains the liquid and raises the liquid within the pipe to expel the liquid from the open top of the pipe, or from a discharge pipe or tube extending from the top of the pipe. Relatively small solid particulates (e.g., sand and gravel) may also be lifted from the bottom of the body of water, depending upon the energy in the airstream and other factors.

A problem with conventional single-stage airlift pumps is that they are incapable of lifting or raising a liquid to a substantial height or head above the surface of the liquid in which the pump is installed. Accordingly, airlift pumps are not conventionally used in applications requiring significant lifting of a liquid, as in deep water, oil wells, and the like. While it is possible to use a series of airlift pumps in such applications, such devices have generally been configured as separate units, where the liquid lifted in the first stage is captured or trapped and then lifted again by a higher second pump operating essentially independently of the lower first pump.

Thus, a multistage pulsating airlift pump solving the aforementioned problems is desired.

SUMMARY OF THE INVENTION

The multistage pulsating airlift pump includes a lowermost air injector stage and at least one air injector stage above the lowermost stage. The stages are disposed in series in a substantially vertical lift pipe. More stages may be provided as required. The injector stages may be supplied with air or other gas for their operation by a single pneumatic pump having air or gas lines branching to each stage. Air or gas flow to each air jet or injector is controlled by a flow control valve, each valve being dedicated to its specific injector. Each flow control valve is, in turn, controlled by a multifunction timer. Each timer above the lowermost stage or unit receives input from a capacitive sensor installed along the lift pipe, each sensor communicating electronically with its specific timer unit.

The timer units do not operate to open and close the flow control valves simultaneously. Rather, each timer is adjusted to have a delay that depends upon a number of parameters, including the height or span between air or gas injectors within the pipe, the total height of the pipe, the lifted height above the liquid surface, the pipe diameter, and the air or gas pressure used. The sensors sense the density of the fluid (liquid slug or gas bubble or slug) flowing therepast at any given instant. When a sensor senses a large gas bubble or slug flowing past the sensor, the sensor sends an appropriate signal to its timer. When the timer receives the signal, the predetermined delay time is started. When the delay time has elapsed, the timer signals the flow control valve to open in order to discharge another slug of air or gas into the line. Thus, the vertical array of airlift injector stages operates in temporal sequence to send a series of longitudinally spaced air or gas slugs or bubbles through the pipe, thereby providing a continuous lifting action through most of the height of the pipe.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The multistage pulsating airlift pump includes a series of individual air injector stages installed in series in a substantially vertical riser or lift pipe. Each successively higher stage provides additional lifting force for liquid in the pipe. The combined airlift injector stages, when operated in proper sequence, are capable of producing a considerably higher head or lifting force than a single airlift pump stage.

Figure 1:
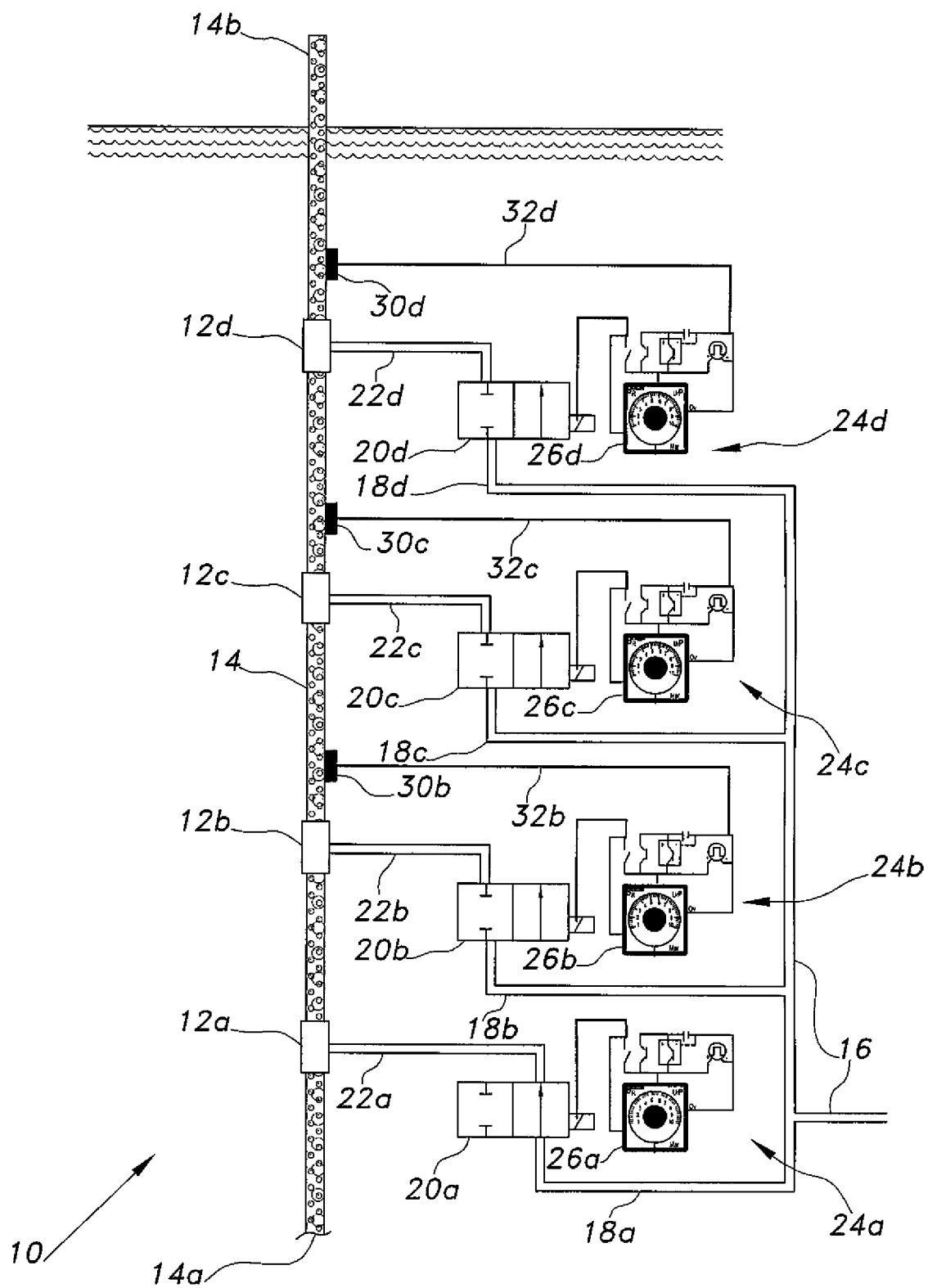
FIG. 1 is a schematic elevation view of a multistage pulsating airlift pump according to the present invention, incorporating a plurality of air injector stages.

FIG. 1 provides a schematic illustration of an exemplary multistage pulsating airlift pump assembly 10 in accordance with the present invention. The airlift pump assembly 10 of FIG. 1 includes a lowermost airlift air injector stage 12a and three successively higher airlift air injector stages 12b, 12c, and 12d. While a total of four airlift injector stages are illustrated in FIG. 1, it should be understood that this number is exemplary, and the system may have as few as one lowermost injector stage and one injector stage above the lowermost injector stage, or more injector stages than shown in FIG. 1 installed above the lowermost injector stage. The series of airlift injector stages 12a through 12d are installed along a riser or lift pipe 14, which has an open lower or inlet end 14a and an open upper or outlet end 14b. It will be seen that the upper end 14b of the pipe may be connected to another pipe (not shown) to transport the lifted liquid from the pipe 14.

A pressurized source 16 of air or other gas is provided, and the air or gas flow is controlled by separate controls for each of the airlift injector stages 12a through 12d. The pressurized air or gas source 16 is indicated as a single pipe or line in FIG. 1, but it will be understood that this supply line 16 would be connected to a conventional source of air or other gas, e.g., an air compressor, tanks of compressed air or other gas, etc. A plurality of individual air or gas supply lines 18a through 18d branch from the gas supply source or line 16. Alternatively, each injector stage 12a through 12d could be provided with its own independent supply of pressurized air or gas, if desired. Each of the individual lines 18a through 18d extends to a corresponding electronically controlled valve 20a through 20d. A separate valve-to-injector line 22a through 22d connects each of the valves 20a through 20d to its respective airlift injector stage 12a through 12d.

The first or lowermost valve 20a is controlled by a corresponding first or lowermost timer 24a, and successively higher valves 20b, 20c, and 20d are controlled by corresponding higher timers 24a, 24b, and 24c. The various timers 24a through 24d are individually adjustable to actuate their respective valves 20a through 20d as desired to time the discharge of air or gas into their respective airlift injector stages 12a through 12d.

Figure 2:
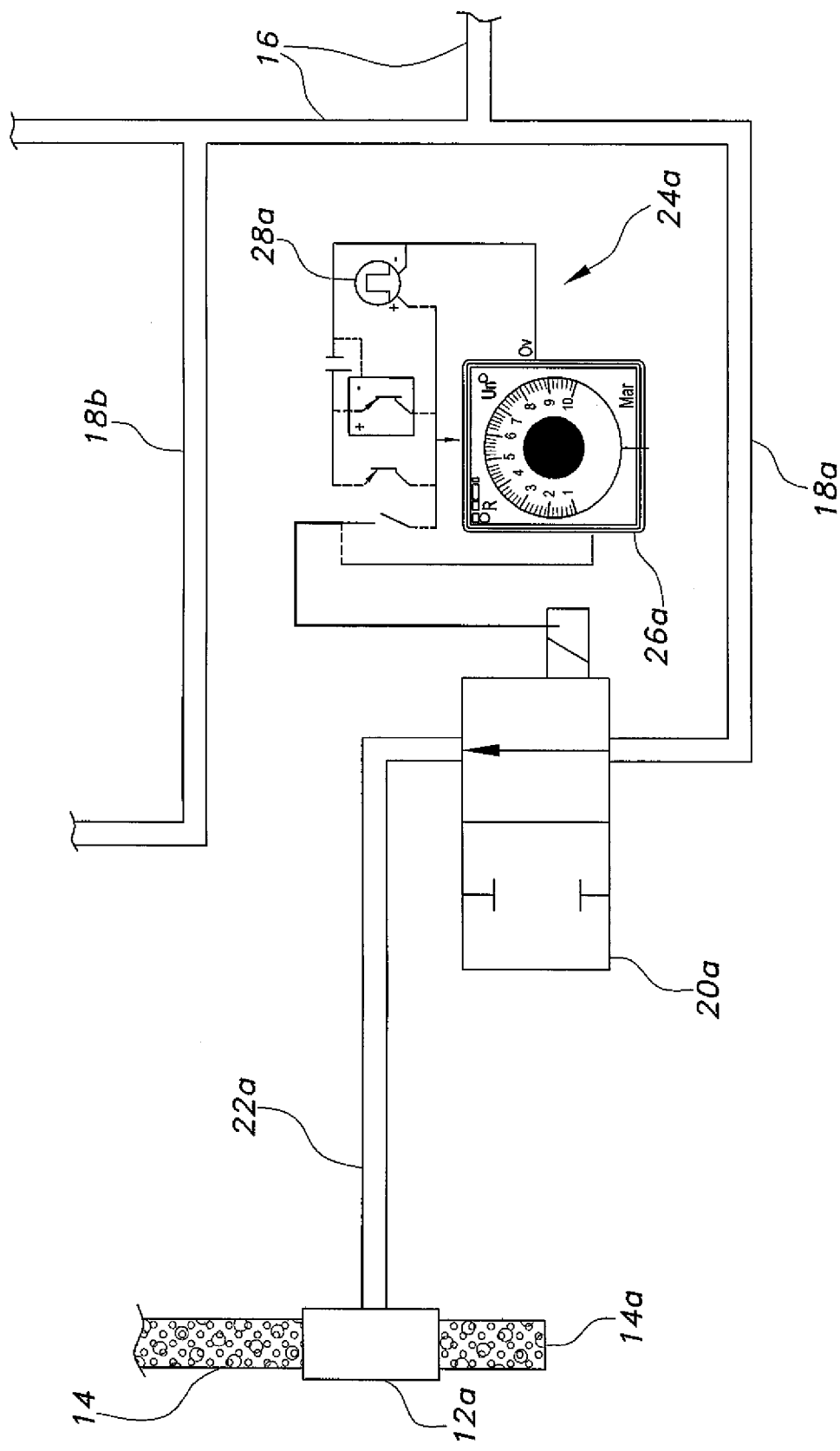
FIG. 2 is a schematic elevation view of a first air injector stage of the multistage pulsating airlift pump according to the present invention, illustrating details thereof.

FIG. 2 provides a more detailed schematic view of the lowermost or first airlift injector stage 12a, its air or gas supply branch line 18a, its electrically controlled valve 20a, its valve-to-injector pneumatic supply line 22a, and its timer assembly 24a. The timer assembly 24a includes a timer control 26a and a short pulse generator 28a incorporated in the circuit. The timer control 26a and the pulse actuator or controller 28a may be set to control the frequency of operation and the open duration of the electrical valve 20a, thus controlling the frequency and duration of air or gas discharge into the airlift injector stage 12a. These adjustments are dependent upon a number of factors, including the total length of the riser or lift pipe 14, the head or height of the upper end 14b above the liquid surface, the pressure head of the liquid in which the pump assembly 10 is installed, the distance or height between vertically adjacent pumps, the pipe diameter, and various gas pressure and fluid viscosity considerations.

Figure 3:
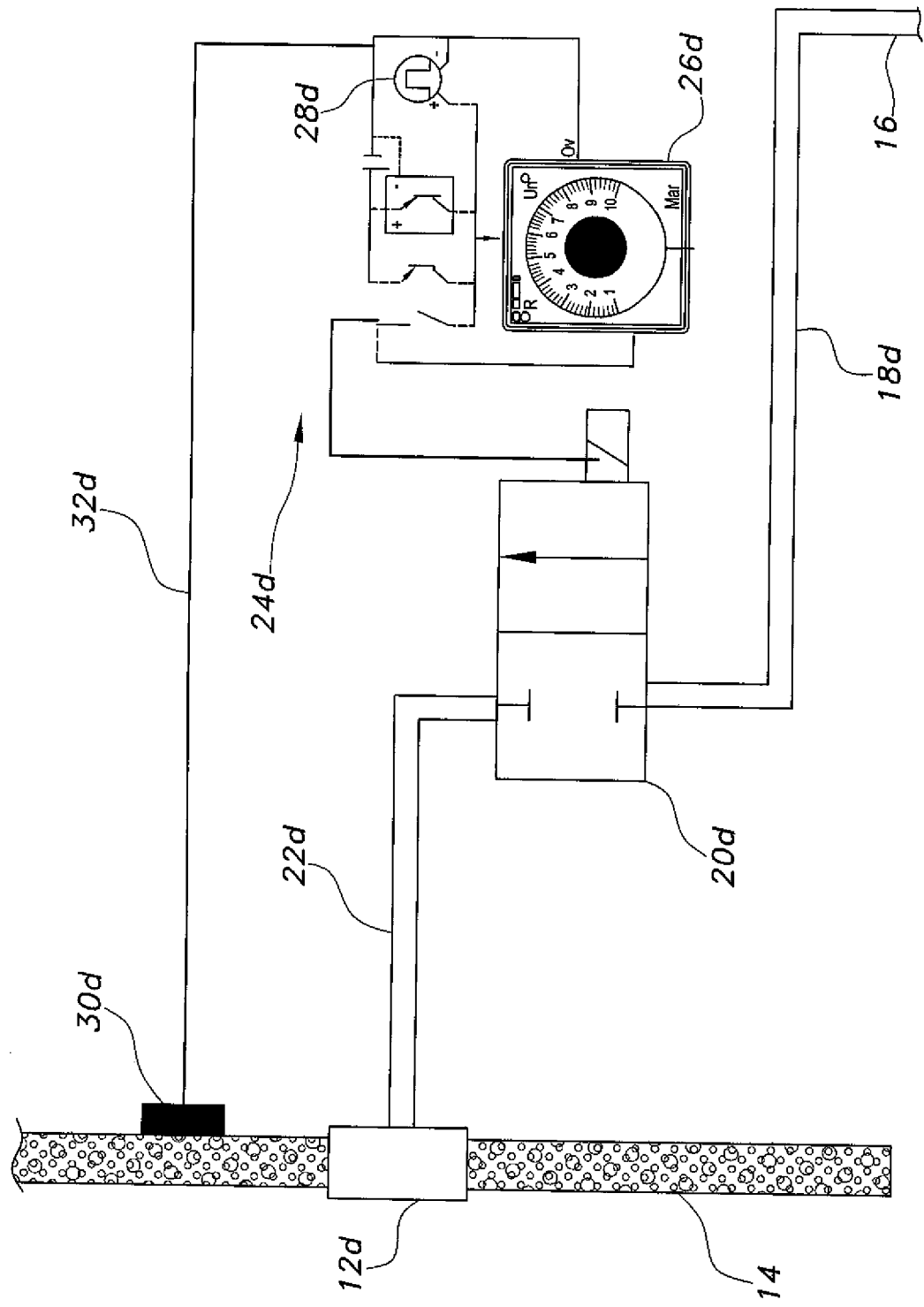
FIG. 3 is a schematic elevation view of an upper air injector stage of the multistage pulsating airlift pump according to the present invention, illustrating details thereof.

As no airflow is introduced to the pipe 14 below the first airlift pump 12a, it will be seen that there is no need for a signal from the flow in the pipe 14 back to the first timer assembly 24a to control its valve 20a and the airflow to its associated airlift injector stage 12a. However, each higher airlift injector stage includes some means of controlling its actuation, depending upon the air and liquid flow through the next lower injector stage. FIG. 3 provides a schematic illustration of the highest injector stage 12d in the system, and its various controls. However, it should be understood that the schematic for the airlift injector stage 12d and its associated controls is also applicable to each of the intermediate injector stages and their controls, i.e., injector stages 12b and 12c, the only difference being the termination of the air or gas supply line 16 at its juncture with the individual supply line 18d, as there is no need for the supply line 16 to extend beyond its supply to the uppermost injector stage 12d and control assembly.

A sensor, e.g., sensor 30d in FIG. 3, is installed upon the pipe 14 at some vertical distance above its corresponding airlift injector stage 12d. The other sensors 30b and 30c are shown in FIG. 1, there being no need for a sensor between the lower two airlift injector stages 12a and 12b, as noted further above. The sensors 30b through 30d may be capacitance-type sensors, capable of detecting the difference between air (or other gas) and water (or other liquid) within the pipe 14 as the various phases (liquid and gas) flow through the pipe 14. Sensors using other principles of operation may be used in lieu of capacitance sensors, if practicable. Each of the sensors 30b through 30d communicates electronically with its respective timer and control assembly 24b through 24d via a signal line or wire 32b through 32d, as shown in FIG. 1.

FIG. 1 of the drawings provides a comprehensive illustration for the explanation of the operation of the multistage pulsating airlift pump apparatus 10. The apparatus 10 operates initially by delivering a large pulse of air or gas into the lower portion of the riser or lift pipe 14 from the lowermost airlift injector stage 12a. The duration and delivery frequency of the air slugs or pulses is determined by the settings of the first or lowermost timer assembly 24a. The air or gas slug will rise in the pipe 14, entraining liquid with it as it rises, as is well known in the field of airlift pumps. As the air or gas slug passes beyond the second airlift injector stage 12b, it passes the sensor 30b installed above the second airlift injector stage 12b. The sensor 30b detects the air slug as it passes, and sends a signal to its respective timer and valve control assembly 24b via the connecting line 32b. The timer 26b has been previously set as desired, depending upon the parameters (pipe height, distance between pumps, etc.) noted further above. When the appropriate elapsed time has passed, the timer 26b sends a signal to its corresponding control valve 20b to open for a period of time as set by its pulse control, the pulse controls being shown as devices 28a and 28d in FIGS. 2 and 3. The valve 20b opens to release a pulse or slug of air or gas into the pipe 14 at the second airlift injector stage 12b below the passage of the first pulse or slug of air, as the first pulse or slug has passed above the sensor 30b at this point.

This operation continues when the first pulse or slug of air continues to rise and pass the second sensor 30c. The sensor 30c operates as described above for the first sensor 30b, and signals the third timer and valve assembly to deliver a pulse of air from the third airlift injector stage 12c. Substantially simultaneously with this part of the operation, the second pulse or slug of air is passing the first sensor 30b, whereupon a third slug of air or gas is released through the second airlift injector stage 12b. Meanwhile, the first or lowermost timer assembly 24a continues to release slugs or pulses of air or gas to the first or lowermost airlift pump 12a, and these subsequent pulses trigger additional pulses from the higher pumps 12b through 12d as they pass those respective sensors 30b through 30d. Thus, the airlift injector stages 12a through 12b provide a series of temporally spaced or sequenced air or gas pulses into the lift pipe 14. Each successively higher injector stage and its timer follows the next lowest injector stage and timer in temporal sequence to provide continuous entrainment of liquid through the pipe 14 and enhance the efficiency of the airlift pump system considerably over that provided by a single-stage airlift pump.

It is to be understood that the present invention is not limited to the embodiments described above, but encompasses any and all embodiments within the scope of the following claims.

We claim:

1. A multistage pulsating airlift pump assembly, comprising:
   a lift pipe having an open lower end and an open upper end;
   a lowermost air injector stage disposed within the lift pipe;
   a plurality of air injector stages disposed within the lift pipe above the lowermost air injector stage;
   a pressurized gas source providing pressurized gas to each of the air injector stages;
   a lowermost timer communicating with the lowermost air injector stage;
   a plurality of higher timers, each said higher timer communicating with a corresponding one of the higher air injector stages, each timer intermittently actuating the respective higher air injector stage in temporal sequence, the higher timer following the lowermost timer in sequence; and
   a corresponding capacitance sensor disposed above each of the higher air injector stages, the corresponding capacitance sensor communicating with the respective higher timer of the corresponding one of the higher air injector stages.

2. The multistage pulsating airlift pump assembly according to claim 1, further comprising a valve communicating electronically with each said timer, each of the valves selectively releasing pressurized gas to the respective air injector stage according to the respective timer.

3. The multistage pulsating airlift pump assembly according to claim 1, further comprising a pulse actuator connected to each of the timers, each of the timers and pulse actuators selectively delivering a short pulse air injector stage actuating signal.

4. The multistage pulsating airlift pump assembly according to claim 1, wherein the pressurized gas source comprises a single gas source having a branch extending to each of the air injector stages.

5. A multistage pulsating airlift pump assembly, comprising:
- a lift pipe having an open lower end and an open upper end;
- a lowermost air injector stage disposed within the lift pipe;
- a plurality of higher air injector stages disposed within the lift pipe above the lowermost air injector stage;
- a pressurized gas source providing pressurized gas to each of the air injector stages;
- a first valve connected between the pressurized gas source and the lowermost air injector stage;
- a first timer and a first pulse actuator circuit connected to the first valve for opening and closing the first valve at timed intervals to release a slug of the pressurized gas through first injector stage into the lift pipe; and
- a plurality of second timers;
- a plurality of second pulse actuator circuits; and
- a plurality of capacitance sensors respectively connected to the plurality of higher air injector stages, each said higher air injector stage having a corresponding second valve connected between the pressurized gas source and the lowermost air injector stage, each said capacitance sensor being disposed in the lift pipe above a corresponding one of the higher air injector stages for sensing passage of the slug of pressurized gas and sending an actuation signal to the corresponding second timer and the corresponding second pulse actuator circuit, the corresponding second timer and the corresponding second pulse actuator opening and closing the corresponding second valve to release another slug of the pressurized gas through the corresponding higher injector stage into the lift pipe after a predetermined delay upon receiving the actuation signal;
- whereby each of the air injector stages sequentially injects at least one slug of pressurized gas into the lift pipe to lift a fluid contained therein by multistage pumping action.

6. The multistage pulsating airlift pump assembly according to claim 5, wherein the pressurized gas source comprises a single gas source having a branch extending to each of the air injector stages.

* * * * *